(No Model.)
J. A. MORRELL.
APPARATUS FOR CONCENTRATING SOLUTIONS AND EXTRACTING SOLIDS THEREFROM.
No. 441,621. Patented Nov. 25, 1890.
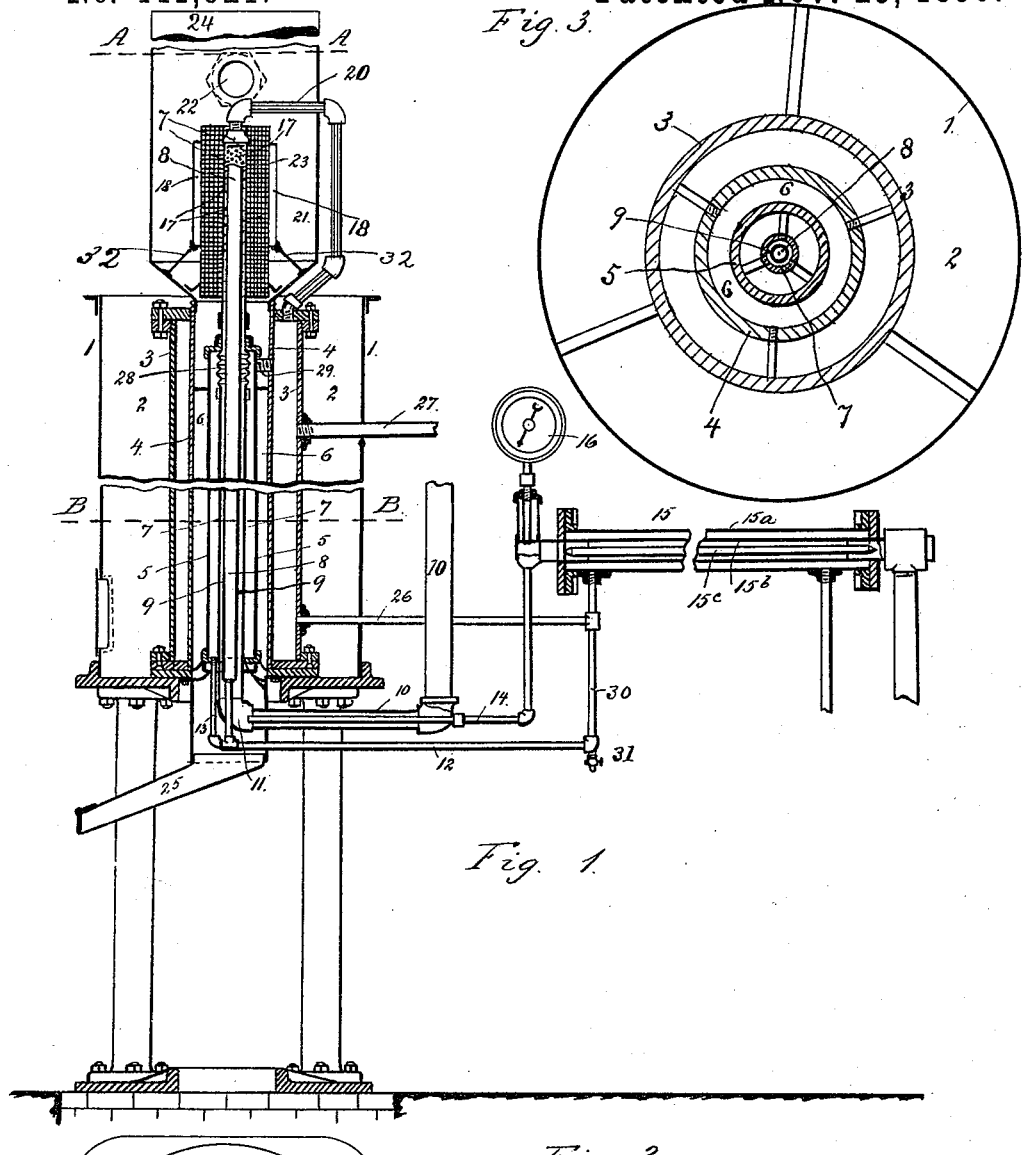
Witnesses:
Hans A. Hiller
Henry J. Palmer
Inventor
Jas. A. Morrell
by L. Lloyd Wiegand
atty

UNITED STATES PATENT OFFICE.

JAMES A. MORRELL, OF LANSDALE, ASSIGNOR OF ONE-HALF TO GIDEON W. MARSH, OF PHILADELPHIA, PENNSYLVANIA.

APPARATUS FOR CONCENTRATING SOLUTIONS AND EXTRACTING SOLIDS THEREFROM.

SPECIFICATION forming part of Letters Patent No. 441,621, dated November 25, 1890.

Application filed June 28, 1889. Renewed November 3, 1890. Serial No. 370,111. (No model.)

*To all whom it may concern:*

Be it known that I, JAMES A. MORRELL, a citizen of the United States, residing at Lansdale, in the county of Montgomery and State of Pennsylvania, have invented certain new and useful Improvements in Apparatus for Concentrating Solutions and Extracting Solids Therefrom; and I do hereby declare the following to be a sufficiently full, clear, and exact description thereof to enable others skilled in the art to make and use the said invention.

This invention relates to apparatus for concentrating solutions; and it consists in certain peculiarities of construction and arrangement of parts, as will be hereinafter fully set forth, and pointed out in the claims.

The object of the invention is to make stronger solutions or sirups by the concentration of saccharine and other liquids and to separate sugar from the same in dry crystalline form.

The manner of applying heat in this apparatus is twofold: first, by rapidly passing the liquid through small pipes or conduits or in thin films through highly-heated pipes or vessels, and, second, by the injection of heated air or gases into such liquids under pressure at high temperature and the separation of water therefrom, the same being effected by the release of the solution in finely-divided jets or spray into chambers at high temperature, where the water is free to expand into steam and pass away without condensation, while the sugar and concentrated matter, as the case may be, is precipitated and collected for use.

The apparatus for effecting this is shown in the accompanying drawings, in which—

Figure 1 shows a central vertical section, the middle portion of the apparatus being broken out so as to permit the figure to be shown in a single sheet. Fig. 2 is a horizontal section of the apparatus in the plane indicated by the line A A in Fig. 1; and Fig. 3 shows an enlarged horizontal section at the point indicated by the line B B in Fig. 1, the steam supply and discharge pipes and the superheating apparatus being removed.

Like numeral-references denote like parts throughout the figures.

Surrounding the heating part of the apparatus is a shell or jacket 1, containing a non-conducting material 2, and a strong jacket 3, provided with a steam-inlet pipe 27, and a pipe 26, having a branch pipe 30, provided with a cock 31 for withdrawing steam from the said jacket, which jacket contains a pipe 4, heated by steam introduced through the pipe 27, whereby the pipe 4 maintains its contents at a high temperature. Inside of the pipe 4 is a smaller pipe 5, provided with a short pipe 29, through which superheated steam is introduced into the pipe 5 from the jacket 3, and is discharged through a pipe 13, connected to the base of the pipe 5, the pipe 5 being smaller than the pipe 4. An annular space 6 is left between them, which is constantly kept in a highly-heated condition by the heat from the said pipes and is at ordinary atmospheric pressure. A still smaller pipe 7 is located within the pipe 5, and is constantly maintained in a highly-heated condition by the heat from the latter and from a pipe 8, extending through the pipe 7 and forming an annular space 9, through which the solution to be concentrated is forced, being fed in at its lower end by a pipe 10, connected by an elbow 11 to the pipe 7. A pipe 12 is provided at the lower end of the pipe 8 for draining the latter.

The supply of superheated steam is introduced into the pipe 8 by a pipe 20, one end of which is connected to the top of the jacket 3 and the other end entering the upper end of the pipe 8. The pipes 7 and 8 are arranged one within the other, so as to leave a narrow space 9 between them, whereby the sirup on its passage into said space is continually heated, and by reason of the smaller volume contained in such narrow space it is necessary to maintain the thin hollow column of solution at such temperature for a short time only.

In the pipe 10, which supplies the solution, is introduced a pipe 14, which continually injects heated air or gas into the said pipe from the superheating apparatus, (marked 15,) consisting of an outer pipe 15ª, supplied continuously with superheated steam and inclosing a second pipe 15ᵇ, through which air or gas is forced by means of a pump or other equivalent compressing apparatus, and in which there is preferably placed a core 15ᶜ, which displaces the air from the central portion of the pipe 15ᵇ.

A pyrometer or high-temperature thermometer 16 is inserted at the junction of the pipe 15ᵇ with the pipe 14, by means of which the temperature of the compressed air may be ascertained.

It will be seen that the thin film or column of solution in the pipe 7, surrounding the pipe 8, consists not only of the liquid itself, but also of heated air or gas commingled therewith. This liquid passes to the upper part of the pipe 7, where it escapes through minute apertures 17 in a spray into a chamber 18, having a net 23 extending throughout to prevent too wide a dispersion of the jets, the said chamber and net being inclosed in a jacket 21 to prevent loss of heat by radiation.

The chamber 18 is supported in the jacket 21 by supports or braces 32, which extend from the bottom of the chamber to the lower portion of the said jacket. This chamber is employed to receive the sprayed liquid, and in conjunction with the net 23 prevents too wide dispersion of the liquid, and the chamber being surrounded by the steam-heated jacket 21 prevents the liquid from loss of heat by radiation.

The upper part of the jacket 21 is provided with a suitable lens 22, by which the operation of the jets as they issue into the chamber 18 may be observed, and just above said chamber and forming an upper part of the jacket 21 is a stack or chimney 24 to carry off the vapor from the chamber 18.

A funnel 25 is attached to the lower part of the apparatus, which receives the concentrated matter. The jets or sirup, from the expansive force of the vapor of water or steam which is liberated upon relief of pressure, spread themselves out in the chamber surrounded by the net 23, and the precipitated matter, if the process is conducted with sufficient time for the elimination of all the vapor and steam, is in the form of minute crystals. If the process is worked more rapidly, a solution of sugar, liquor, or sirup in a highly-concentrated condition descends to the bottom and is collected from the funnel 25 for use. By reason of the extremely thin film exposed, and the high velocity of the current of such film, the exposure of the saccharine solution to heat with the air or gas is of extremely short duration, and the instant volatilization of water is in contact with heated atmosphere upon relief of pressure in the space within the screen 23, and in the space 6 below, it affords little or no time for any change or oxidation of the saccharine matter in the solution. This process may be conducted without the injection of air or gas; but evaporation does not then proceed so rapidly, the dispersion of the jets as they issue from aperture 17 in the upper part of the pipe 7 being then entirely dependent upon the expansive force of the aqueous vapor or steam. To prevent straining or leakage of the joints by reason of differences of expansion of different connected parts of the tubes, elastic sections or spring-pipes 28 are introduced, as shown in Fig. 1, which by springing adapt themselves to the changes of form and diminutions of pipes as the temperatures therein vary.

Having thus described my invention, what I claim as new, and desire to secure by Letters Patent, is—

1. In an apparatus for concentrating solutions, the combination of the surrounding jacket containing a non-conducting material with the jacket 3, provided with steam inlet and outlet pipes, the pipes 5 and 4, located the one within the other, so as to leave a space between them, said pipes being provided with a steam-pipe connection 29, the pipes 7 and 8, also located one within the other, so as to leave a smaller space between them, the said jacket 3 being arranged to be heated by steam introduced into it by the pipe 27, substantially as shown and described.

2. In an apparatus for concentrating solutions, the combination of the jackets 1 and 3 and the pipes 7 and 8, arranged one within the other, leaving a space 9 between them, through which the solution to be concentrated is forced, with the pipes 4 and 5, also arranged one within the other, leaving a space 6 between them, and a chamber located directly above them, through which a net or screen extends, from whence the concentrated solution is precipitated through the said space 6, substantially as shown and described.

3. In an apparatus for concentrating solutions, the combination of the pipe 7, adapted to be externally heated, and the pipe 8, arranged to be internally heated, having between them an inclosed chamber 9, with the jet-tube 14, and the superheating apparatus 15, consisting of a pipe surrounded by a steam-chamber, said pipe being arranged to convey air into the saccharine solution from such superheating apparatus, substantially as and for the purpose set forth.

4. In an apparatus for concentrating solutions, the jacket 1, inclosing a series of pipes arranged so as to form two separate and distinct heating-chambers, in combination with the jacket 21, the chamber 18, and the net 23, the said net 23 extending through the said chamber, substantially as and for the purpose set forth.

5. In an apparatus for concentrating solutions, the combination of a jacket provided with a non-conducting material and inclosing a series of pipes, a second jacket located directly above said series of pipes and inclosing the chamber 18, and also a screen or net, with the pipe 7, provided at its upper extremity with apertures, and the steam-connecting pipe 20, substantially as shown and described, and for the purpose set forth.

JAMES A. MORRELL.

Witnesses:
J. DANIEL EBY,
A. V. BUDD.